J. R. WHITTEMORE.

FEED-CUTTER.

No. 7,605. Reissued April 10, 1877.

WITNESSES.
Robt. F. Gaylord
M. F. Dooley

INVENTOR.
John R. Whittemore
By W. E. Simmons
atty

N. PETERS, PHOTO-LITHOGRAPHER, WASHINGTON, D. C.

UNITED STATES PATENT OFFICE.

JOHN R. WHITTEMORE, OF CHICOPEE FALLS, MASSACHUSETTS.

IMPROVEMENT IN FEED-CUTTERS.

Specification forming part of Letters Patent No. 111,594, dated February 7, 1871; reissue No. 7,605, dated April 10, 1877; application filed October 16, 1876.

*To all whom it may concern:*

Be it known that I, JOHN R. WHITTEMORE, of Chicopee Falls, in the county of Hampden and Commonwealth of Massachusetts, have invented certain Improvements in Feed-Cutters, of which the following is a specification, reference being had to the accompanying drawings, wherein—

Figure 1:
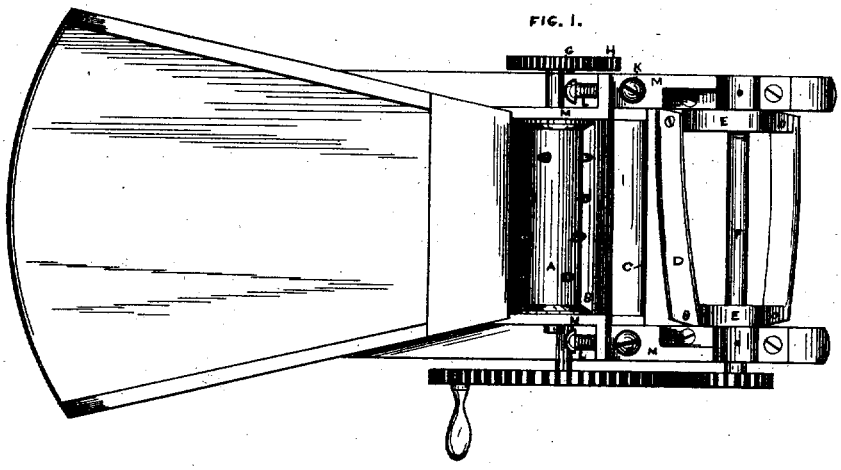
Figure 2:
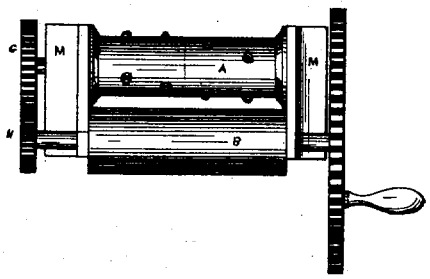
Figure 3:
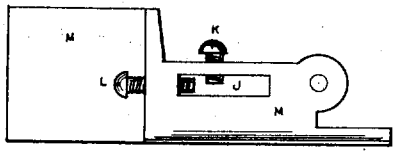

Figure 1 is a top or plan view; Fig. 2, an end view of the feed-rollers with variable gearing. Fig. 3 is a side view of one of my side frames shown as cast in one piece.

I will first describe the machine, and then claim the features which constitute the invention.

The letter A denotes the upper feed-roll, and B the lower. The hay or straw passes forward between these rolls over the ledger-blade C, and is cut by the revolving knife D, which, with the disks E and shaft F, constitutes the cutting-roll.

The gears G H are interchangeable, so that a machine may be made to cut longer or shorter feed at pleasure. Gear G is on the shaft of the upper feed-roll, and gear H is on the shaft of the lower feed-roll. The upper feed-roll is provided with annular series of projecting points, and is the real feed-roll, the lower roll acting only as a revolving surface to prevent friction. The rapidity of the feed depends upon the rapidity of the revolution of gear G. Gears H and G are of different sizes, and interchangeable, so that the rapidity of revolution of the upper roll, and the consequent degree of speed in feed, can be changed by the transposition of gears G H.

The ledger-blade C is secured to the bar I, the ends of which rest in mortises J, made in the side frames, and the position of this bar and the ledger-blade it carries is regulated by the vertical adjusting-screws K and horizontal adjusting-screws L, so that the ledger-blade may be set at such a distance from the cutting-knives as is desired. I prefer that the side frames be cast all in one piece to give stability.

I claim as my invention—

1. In combination, the revolving knives D, the side frames M, having the mortises J, the ledger-bar I, having its ends resting in the mortises J, the vertical and horizontal adjusting-screws K L, and the feed-rolls A B, all substantially as described, and for the purpose set forth.

2. In combination, the feed-rolls A B, with their shafts, the variable and interchangeable gears G H, and the cutting-roll D E F, all substantially as described, and for the purpose set forth.

JOHN R. WHITTEMORE.

Witnesses:
G. W. SMITH,
E. E. SMITH.